Figure 1:
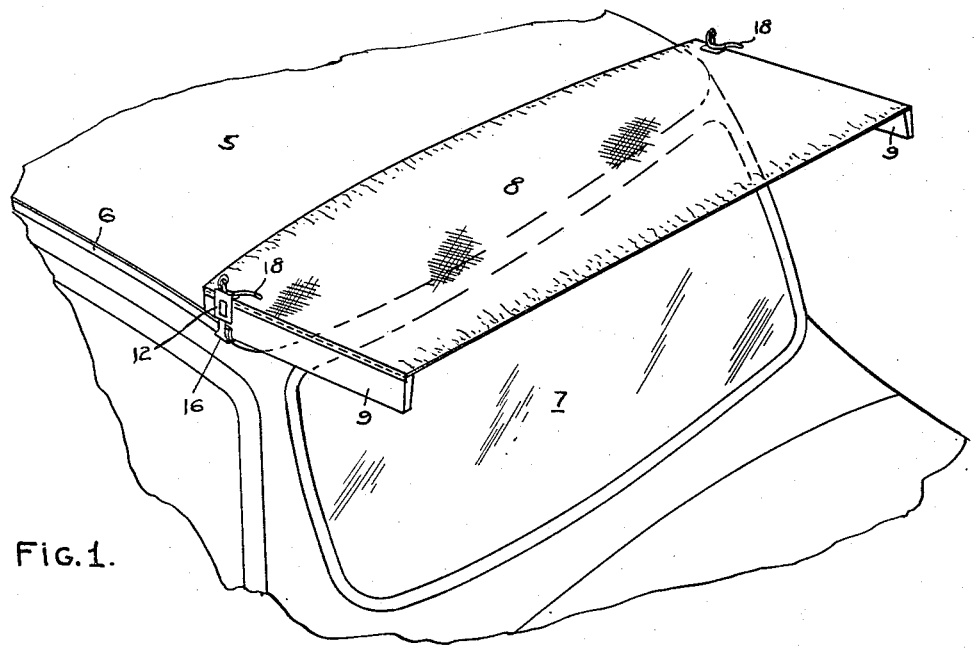

April 29, 1958 G. G. LYSEN 2,832,639
DETACHABLE RAINSHIELD FOR AUTOMOBILE WINDSHIELDS
Filed Nov. 2, 1956

INVENTOR.
GUSTAV G. LYSEN,
BY
ATTORNEY

United States Patent Office 2,832,639
Patented Apr. 29, 1958

2,832,639

DETACHABLE RAINSHIELD FOR AUTOMOBILE WINDSHIELDS

Gustav G. Lysen, Oakland Park, Fla.

Application November 2, 1956, Serial No. 620,141

5 Claims. (Cl. 296—95)

This invention relates to a rain shield for detachable connection with the forward portion of a vehicle and whereby to project forwardly and overlie the wind shield of the vehicle as a protective means against rain or the like striking the wind shield and obscuring the vision therethrough.

It is well known, that in drive-in theaters, it frequently happens that a rain will suddenly come up, obscuring the vision through the wind shield and requiring that the occupant run the vehicle motor in order to operate the wind shield wipers. This is not only a dangerous situation, but causes disagreeable gases to be expelled adjacent to vehicles parked therearound.

The prime purpose of this invention is to provide a relatively simple collapsible type of shield that may be bundled into a relatively small package for storage in the glove compartment or other area of the vehicle and that may be quickly and easily assembled over the front part of the vehicle to closely conform to the curvature of the vehicle top and with the opposite ends being rigid and having a seating clamping engagement with respect to the conventional drip gutters.

The invention further contemplates a rain shield embodying a section of water repellent material that is provided in its opposite longitudinal edges with elastic members and whereby the device will readily accommodate itself to vehicles of varying widths.

The invention further contemplates novel clamping means for the rigid end members of the shield whereby they are readily clamped into engagement with the gutters in a manner that supports the end members rigid with respect to the vehicle to thereby maintain the water repellent material in a taut condition, and with the clamps being such as to require no tools for the installation of the device.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
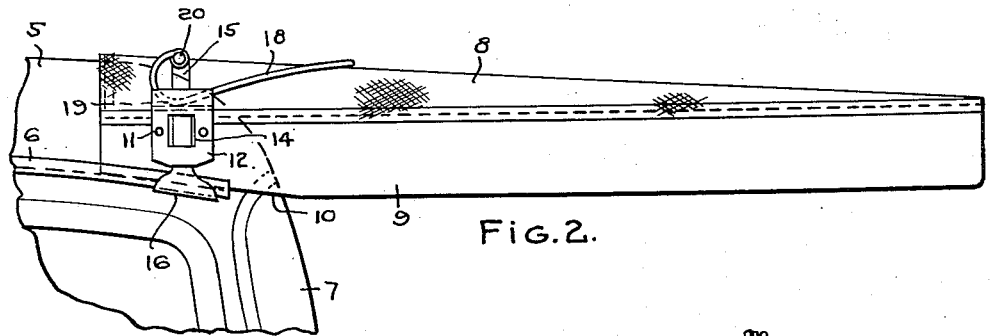
Figure 3:
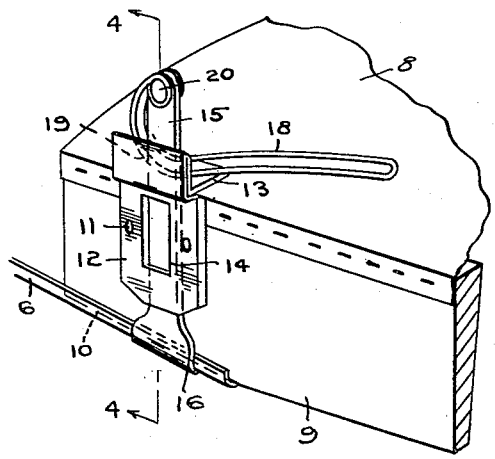
Figure 4:
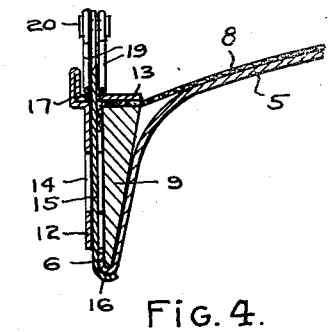

In the drawings:

Figure 1 is a fragmentary perspective view of the forward portion of a motor vehicle showing the invention applied thereto, Figure 2 is an enlarged side elevation with the device in clamped relation to the vehicle, Figure 3 is a fragmentary perspective view of one clamp and associated elements and, Figure 4 is a fragmentary section taken substantially on line 4—4 of Figure 2.

Referring specifically to the drawings, the numeral 5 designates a vehicle top that is normally transversely curved and that terminates in drip gutters 6, such being common to most conventional vehicles having a rigid top. The top 5 normally curves downwardly to join a transparent windshield 7. The structure so far described is common to a conventional vehicle. Disposed across the forward part of the roof 5, to project therebeyond and to overlie the windshield 7, is a section of flexible and preferably fabric water repellent material 8. The opposite longitudinal edges of the material 8 are provided with suitable hems having elastic strips therein. The opposite ends of the section 8 are tacked or otherwise connected with rigid end members 9, formed of wood, plastic or any other desirable material. The members 9 are generally wedge shape in cross-section and their rear extremities are beveled upwardly as at 10, whereby to generally conform to the inclination of the forward ends of the gutters 6. The inner walls of the members 9 generally conform to the transverse curvature of the vehicle top and whereby the members 9 at their rear portions maintain a relatively snug seating engagement within the gutters in a manner to prevent lateral rocking motion of the members 9.

Fixed to the rear portions of the end members 9, as by screws or other fastening devices 11 are bracket plates 12. The bracket plates 12 at their upper ends are bent upon themselves and then bent inwardly to lie flat upon the upper edges of the members 9, as at 13. The brackets 12 had been stamped as at 14 to form a guide channel for a vertically shiftable clamping bar 15. The bar 15 at its lower end is flared outwardly and its lower end is bent inwardly to form a rounded clamping tongue 16, the cross-sectional curvature of which conforms generally to the curvature of the bottom of the gutter 6. The bars 15 extend upwardly through a lot 17 formed in the lip portion 13 at its upper end and is pivotally connected to an arcuate clamping lever 18. The clamping lever 18 constitutes a cam having a camming surface 19 that bears upon the lip 13 when the device is shifted to a clamping position with respect to the gutter. The camming area of the lever 18 is preferably formed of spaced apart parallel sections that engage upon opposite sides of the bar 15 for receiving the pivot pin 20. Since the pressure necessary to provide the clamping action is relatively small, the clamping lever and the cam portion may be formed from a section of wire having sufficient hardness or it may be formed in any other desirable manner.

In the use of the device, should it start to rain during the showing of a motion picture or other form of entertainment, the operator merely takes the device, engaging one end member with its respective gutter 6 and clamping the tongue 16 into clamping engagement with the bottom of the gutter. The device is then extended across the top of the vehicle, stretching it against the tension of the elastic members until the opposite end member 9 is engaged within its respective gutter and likewise clamped into position. At this point, the rear marginal edge of the fabric cover 8 closely conforms to the major curvature of the vehicle top while the forward longitudinal edge is relatively straight. The conforming of the rear marginal edge will successfully prevent water running from the roof and downwardly over the windshield. After the rain has stopped, the cam levers are quickly and easily shifted to a release position and the entire device removed and bundled together and stored. While the specific type of clamps have been found highly practical, it will be apparent that other clamping means may be employed with equal success for quickly and easily mounting the device upon the vehicle.

It will be apparent from the foregoing that a very novel and simple construction has been provided whereby a rain shield may be quickly and easily installed with a minimum of effort and that will most effectively protect the windshield against rain water. The parts are few and simple, are cheap to manufacture, are strong, durable and most effective for the purposes indicated.

It is to be understood that the invention is not limited to the precise arrangement shown, but that changes are contemplated as readily fall within the spirit of the invention as shall be determined by the scope of the subjoined claims.

Having described my invention, what I claim as new and desire to secure by Letters Patent is:

1. A collapsible and extensible rainshield for use upon the forward portion of a vehicle top and whereby to extend forwardly beyond the top to overlie a windshield carried by the vehicle, the said shield embodying rigid end bars and a flexible sheet of water repellent material connected to the end bars and with the sheet being extensible across the vehicle from side to side and with the rear longitudinal edge of the sheet lying in contacting and conforming relation to the transverse curvature of the vehicle top, the said sheet along its longitudinal edges being provided with elastic members whereby the sheet is extensible for vehicles of varying widths, the said bars being wedge shaped transversely and whereby their rear extremities have a substantial seating engagement within the forward portions of drip gutters carried upon opposite sides of the vehicle and whereby to support and project the bars in a definite angularity forwardly of the windshield, a clamp device carried adjacent the rear end of each of the bars and cam means whereby the clamps are clamped into engagement with the bottom of the gutters for rigidly supporting the bars in seated engagement in the bottoms of the gutters to extend forwardly of the top and to maintain the said sheet in an extended stretched position to overlie the windshield.

2. The structure according to claim 1 wherein the rear ends of the bars are rearwardly tapered to conform to the angularity of the end portions of the gutters and whereby the bars are maintained in generally a horizontal plane, the wedge shape of the bars providing a lower relatively narrow edge that engages within the said gutters for their full depth.

3. The structure according to claim 1 wherein the said clamps embody a bracket plate fixedly connected to the outer sides of the bars, the said bracket plates being stamped to form a vertical guide, a slide bar vertically shiftable in the bracket plates and with the bars projecting upwardly above the bracket plates, the lower end of the bars projecting below the bracket plates and provided at their lower ends with an elongated hook that is shaped to conform to the outer transverse curvature of the gutters, the upper end of each bar having pivotal connection with the said cam means and whereby the cam means actuates the bar upwardly for clamping engagement beneath the gutter and for clamping the first named bars into seating engagement within the gutters.

4. A rainshield of the character described for use with motor vehicles and whereby to project forwardly to overlie the windshield of the vehicle, comprising a rectangular sheet of flexible water repellent material and with the sheet at its opposite ends being connected to rigid end bars, the sheet at its longitudinal edges having resilient hems, the bars being wedge shaped in cross-section and whereby to form a narrow lower edge that has full seating engagement within the forward portions of drip gutters carried upon the opposite sides of the top portion of the vehicle, the said rainshield being extensible and collapsible, the said end bars adjacent their rear ends being provided with clamping devices that embody a guide bracket and a clamping bar slidable vertical therethrough, the said bracket being connected to the outer faces of the end bars and with their upper portions bent to form a horizontal lip that overlies the upper edges of the end bars and the adjacent area of the connected ends of the sheet, the slide bars projecting upwardly above the said lip and pivotally connected at their upper ends with an actuating cam, the slide bars at their lower ends being flared outwardly and bent to form a hook that engages beneath the said gutters, each of the cams being provided with an elongated handle whereby to actuate the cams for shifting the slide bars to and from a clamping engagement with the gutters, the said clamping devices when in the clamped position with respect to the gutters maintaining the end bars in a fixed position to extend forwardly of the vehicle top in generally a horizontal and parallel position, the said end bars upon opposite sides of the vehicle when in clamped position disposing the rear longitudinal portion of the sheet in stretched conforming engagement with the transverse curvature of the top and with the forward longitudinal edge of the sheet in substantially a straight line.

5. The structure according to claim 4 wherein the cams and their actuating handle are formed from a section of wire that is bent upon itself to form parallel leg portions that constitute the handle and a pair of parallel camming ends that are pivotally connected to the upper end of the slide bar and with the camming ends being disposed upon opposite sides of the slide bar.

References Cited in the file of this patent

UNITED STATES PATENTS

| | | |
|---|---|---|
| 2,288,442 | Felton | June 30, 1942 |
| 2,663,472 | Belgau | Dec. 22, 1953 |
| 2,728,502 | Plantico | Dec. 27, 1955 |
| 2,739,748 | Hoover | Mar. 27, 1956 |
| 2,743,957 | Sherman | May 1, 1956 |
| 2,783,082 | Genua | Feb. 26, 1957 |
| 2,783,367 | Locke | Feb. 26, 1957 |